G. VON ARCO & A. MEISSNER.
SYSTEM FOR SIGNALING BY WIRELESS TELEGRAPHY UNDER THE QUENCHED SPARK METHOD.
APPLICATION FILED NOV. 30, 1914.
1,162,830.  Patented Dec. 7, 1915.
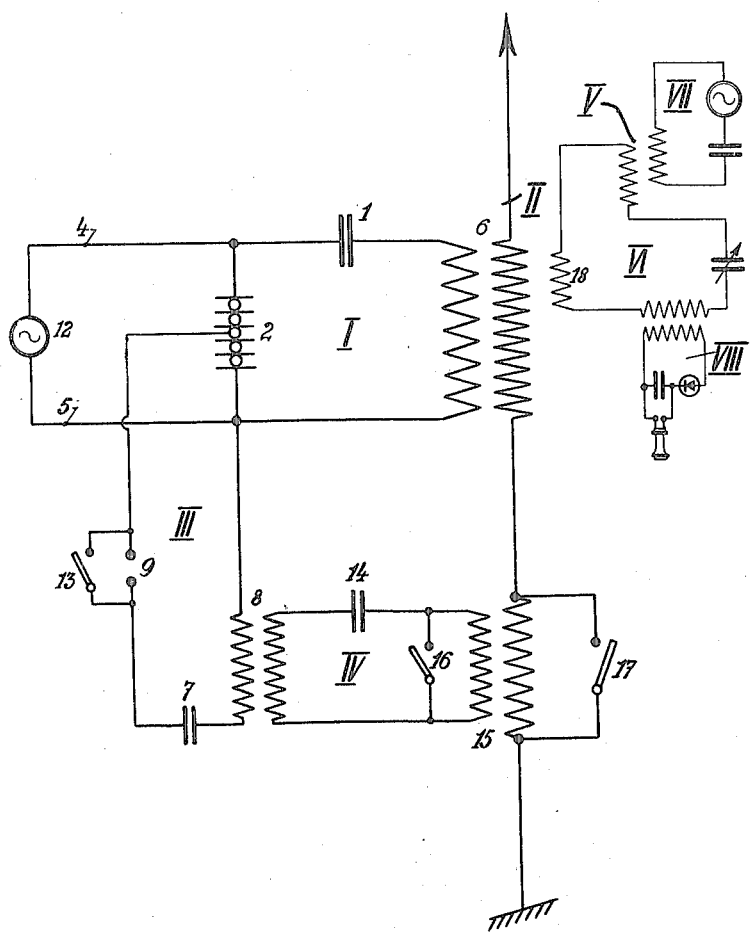
Witnesses:
Elsie Svenson
Ray J. Ernst.
Inventors
Georg von Arco, and
Alexander Meissner
By
Attorneys.

UNITED STATES PATENT OFFICE.

GEORG von ARCO AND ALEXANDER MEISSNER, OF BERLIN, GERMANY, ASSIGNORS TO GESELLSCHAFT FUR DRAHTLOSE TELEGRAPHIE M. B. H., OF BERLIN, GERMANY, A CORPORATION OF GERMANY.

SYSTEM FOR SIGNALING BY WIRELESS TELEGRAPHY UNDER THE QUENCHED-SPARK METHOD.

1,162,830.   Specification of Letters Patent.   Patented Dec. 7, 1915.

Application filed November 30, 1914. Serial No. 874,786.

*To all whom it may concern:*

Be it known that we, GEORG VON ARCO, manager, and ALEXANDER MEISSNER, civil engineer, both of 9 Tempelhofer Ufer, Berlin, Germany, have invented certain new and useful Improvements in Systems for Signaling by Wireless Telegraphy Under the Quenched-Spark Method, of which the following is a specification.

Our invention relates to wireless telegraphy and more especially to the system of wireless telegraphy called quenched spark system.

It has for its object to render the reception of signals at the receiving station by means of interference possible also with transmitters working after the quenched spark method. Up to day it has been impossible for interference reception from damped transmitters, even with a high frequency of impulses, to obtain pure interference sounds. The signals themselves could be heard in the ordinary detector apparatus as pure tones, but in the reception by interference these tones disappeared completely and hissing sounds scarcely more audible than the tones received by ordinary reception appeared in their stead. For this reason the application of interference reception has up to day been restricted to stations served by undamped and continuous wave transmitters.

The impossibility of receiving interference tones from transmitters of the quenched spark system was the more astonishing in view of the fact that these transmitters in using great wave-lengths and a high impulse frequency emit almost continuous waves. If for instance the wave-length is 7.5 kilometers and the impulse frequency 1000 per second, the antenna circuit is furnished with fresh energy after each fortieth oscillation. If, in this case, the damping of the antenna is 0.05, the decreasing amplitude at the moment when fresh energy is furnished, will still be one tenth of the original amplitude.

Now interference tones will form only under the condition that the right phase be maintained in the transmitter so that the interference action will become effective beyond the oscillations of a single wave-train and that two or more succeeding wave-trains coöperate with the interference oscillation to produce surgings. Whether there are intervals or not between the wave-trains at the transmitting station is of less importance; for at the receiving station there are a number of oscillation circuits—the antenna and one or more weakly damped intermediate circuits—which on account of their loose coupling receive the energy transmitted to them by the transmitter only gradually, and which build up the oscillations to the maximum amplitude and also cause them to die away gradually. Therefore it is possible to obtain a continuous oscillation—of varying amplitude—in the receiving system also in those cases where the wave-trains of the antenna at the transmitting station are separated by intervals.

Our invention has for its object to enforce the setting in of the wave-trains at the transmitter in coincidence with the phases.

It consists in arranging in the transmitter a special closed weakly damped oscillation circuit tuned to the oscillations of the antenna and producing at the spark-gap, corhythmically with the antenna oscillations, an auxiliary voltage which effects the setting in of the sequence of ignitions in coincidence with the phases.

The new system is shown in the drawings in the form at present preferred by us.

I is the exciting circuit, II the antenna circuit. The exciting circuit, comprising a capacity 1 and a device 2 for producing oscillations, such as for instance a series sparkgap or a rotating interrupter, is connected with the charging device 12 by means of wires 4 and 5, and delivers the energy through the coupling transformer 6 to the antenna circuit II. The system further comprises a circuit III inclosing a capacity 7, one coil of the coupling transformer 8, a spark-gap 9 and a device 13 for shortcircuiting this spark-gap. The other coil of transformer 8 is connected with a circuit IV comprising besides a condenser 14 and one coil of a coupling transformer 15, the other coil being connected in the antenna circuit II. By means of switches 16 and 17 the coils of transformer 15 can be short-circuited so as to render a mutual induction of the circuits II and IV impossible. The circuits III and IV shall hereinafter be called "ignition circuit" and "controlling circuit" respectively.

The operation of this system, while the switches 13, 16 and 17 are closed, is as follows: When circuit I is charged, the ignition circuit III will receive a certain charge also. When the discharge begins, circuit I delivers its energy to antenna II, while the ignition circuit III delivers its energy to the controlling circuit IV. Now, if this controlling circuit is considerably less damped than the antenna, the oscillations in it will last much longer and will still be perceptible at the time when the new pressure wave from the charging device 12 has already created in the spark-gap 2 a pressure which is close to the sparking pressure of spark-gap 2. The pressure resulting from the controlling circuit IV still oscillating and being transmitted through the ignition circuit III to spark-gap 2 or part of it, will be added to the pressure wave from charging device 12, and therefore a sparking of the spark-gap 2 will take place at a moment which coincides with the phases of the preceding discharge of circuit I. By placing in circuit the spark-gap 9 by opening switch 13, the effect is improved, as is well known from the so-called ignition connections. By opening the switches 16 and 17, besides the effect described above, a reaction of the antenna circuit II upon the controlling circuit IV will take place also.

It is very important indeed to be able at any time to ascertain whether the transmitter is working in coincidence with the phases, but it is impossible to ascertain this with the ordinary means such as a rotating Geissler-tube or a wave-meter. Therefore, according to our invention a special checking receiver working after the interference system is coupled with the transmitter, this receiver allowing to ascertain the phase coincidence by the appearance of pure tones. The transmitter is then regulated by varying the coupling and the charging pressure until the interference tones of the checking receiver have become pure.

The checking receiver V loosely coupled with the antenna by means of a coil 18 comprises a circuit VI, which can be tuned and can be excited either by the antenna or by another circuit VII. Therefore two oscillations will appear in the circuit VI which will then be brought to interference in the usual way. The interference oscillations are then rendered audible as tones in the indicator circuit VIII.

We claim:—

1. In a system for signaling by wireless telegraphy after the quenched spark method the combination of an exciter circuit I, a device 2 adapted to produce oscillations in said circuit and an antenna circuit II, with a closed, weakly damped oscillation circuit IV tuned to the antenna oscillations, means adapted to connect said oscillation circuit IV with the device for producing oscillations so that the oscillations generated in said oscillation circuit IV create an auxiliary voltage in the rhythm of the antenna oscillations in the device 2 for producing the oscillations, said auxiliary voltage effecting the setting in of the ignition sequence of the exciting circuit in coincidence with the phases.

2. In a system for signaling by wireless telegraphy after the quenched spark method the combination of an exciter circuit I, a device 2 adapted to produce oscillations in said circuit and an antenna circuit II, with a closed, weakly damped oscillation circuit IV tuned to the antenna oscillations, a circuit III connected on one side to said device 2 for producing oscillations and coupled on the other side to said oscillation circuit IV, said circuit III being adapted on the one hand to excite the circuit IV at a discharge in the exciting circuit and to transmit the oscillations of circuit IV, after the discharge has ceased, to the spark-gap so that the oscillations generated in said circuit IV produce an auxiliary voltage in the rhythm of the antenna oscillations at the spark-gap, said voltage effecting the setting in of the ignition sequence of the exciting circuit in coincidence with the phases.

3. In a system for signaling by wireless telegraphy after the quenched spark method the combination of an exciter circuit I, a device 2 adapted to produce oscillations in said circuit and an antenna circuit II, with a closed, weakly damped oscillation circuit IV tuned to the antenna oscillations, a circuit III connected on one side to said device 2 for producing oscillations and coupled on the other side to said oscillation circuit IV, said circuit III being adapted on the one hand to excite the circuit IV at a discharge in the exciting circuit and to transmit the oscillations of circuit IV, after the discharge has ceased, to the spark-gap so that the oscillations generated in said circuit IV produce an auxiliary voltage in the rhythm of the antenna oscillations at the spark-gap, said voltage effecting the setting in of the ignition sequence of the exciting circuit in coincidence with the phases and an auxiliary spark-gap 9 in said circuit III connected to the spark-gap 2.

4. In a system for signaling by wireless telegraphy after the quenched spark method the combination of an exciter circuit I, a device 2 adapted to produce oscillations in said circuit and an antenna circuit II, with a closed, weakly damped oscillation circuit IV tuned to the antenna oscillations, means for connecting said oscillation circuit IV with the device for producing oscillations so that the oscillations generated in said circuit IV produce an auxiliary voltage in the rhythm of the antenna oscillations at the spark-gap, said auxiliary voltage effecting the setting in of the ignition sequence of the exciting circuit in coincidence with the phases, and means for coupling said oscillation circuit IV also with said antenna II.

5. In a system for signaling by wireless telegraphy after the quenched spark method the combination of an exciter circuit I, a device 2 adapted to produce oscillations in said circuit and an antenna circuit II, with a closed, weakly damped oscillation circuit IV tuned to the antenna oscillations, a circuit III connected on one side to said device 2 for producing oscillations and coupled on the other side to said oscillation circuit IV, said circuit III being adapted on the one hand to excite the circuit IV at a discharge in the exciting circuit and to transmit the oscillation of circuit IV, to the spark gap, after the discharge has ceased, so that the oscillations generated in said circuit IV produce an auxiliary voltage in the rhythm of the antenna oscillations at the spark-gap, said voltage effecting the setting in of the ignition sequence of the exciting circuit in coincidence with the phases and a checking receiver adapted to work with interference and connected with the transmitter station, said receiver being adapted to allow the observation of coincidence of the phases through the appearance of pure tones.

In testimony whereof, we affix our signatures, in presence of two witnesses.

GEORG von ARCO.
ALEXANDER MEISSNER.

Witnesses:
 HENRY HASPER,
 WOLDEMAR HAUPT.